United States Patent
De La Garza (10) Patent No.: US 10,450,072 B2
(45) Date of Patent: Oct. 22, 2019

(54) SEATBACK ARTICULATION ASSEMBLY AND METHOD

(71) Applicant: B/E Aerospace, Inc., Wellington, FL (US)

(72) Inventor: Javier Valdes De La Garza, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 205 days.

(21) Appl. No.: 15/824,115

(22) Filed: Nov. 28, 2017

(65) Prior Publication Data
US 2019/0161193 A1    May 30, 2019

(51) Int. Cl.
*B64D 11/06*    (2006.01)

(52) U.S. Cl.
CPC ........ *B64D 11/064* (2014.12); *B64D 11/0641* (2014.12)

(58) Field of Classification Search
USPC .................................................. 297/341, 342
See application file for complete search history.

(56) References Cited

U.S. PATENT DOCUMENTS

| | | | | |
|---|---|---|---|---|
| 1,414,637 A * | 5/1922 | Gell | ................... | A47C 1/03238 297/343 |
| 2,558,171 A * | 6/1951 | Chesley | ................. | A47C 1/032 297/354.1 |
| 3,224,808 A * | 12/1965 | Spielman | ............. | A47C 1/0325 297/341 |
| 4,469,374 A * | 9/1984 | Kashihara | ................ | B60N 2/66 297/284.4 |
| 5,472,261 A * | 12/1995 | Oplenskdal | ........ | A47C 1/03255 297/342 |
| 6,059,364 A * | 5/2000 | Dryburgh | ............. | A47C 1/0352 297/354.13 |
| 6,554,360 B1* | 4/2003 | Wilke | ................... | B60N 2/0284 297/284.4 |
| 7,322,641 B2* | 1/2008 | Ekornes | ................. | A47C 1/036 297/61 |
| 7,874,618 B2* | 1/2011 | Kohl | .................... | B60N 2/2209 297/284.4 |
| 8,616,643 B2* | 12/2013 | Darbyshire | ............ | B64D 11/06 297/342 |
| 9,687,079 B1* | 6/2017 | Grove | .................... | A47C 7/445 |
| 9,731,830 B2* | 8/2017 | Ozaki | ................ | B64D 11/0642 |

* cited by examiner

*Primary Examiner* — Sarah B McPartlin
(74) *Attorney, Agent, or Firm* — Clements Bernard Walker PLLC (57) ABSTRACT

A passenger seat including an adjustable seat pan and a seatback segmented into at least lower and upper portions, wherein a drive link moveable in response to seat pan motion moves between cam followers on the lower and upper seatback portions to drive movement of the seatback portions to control the angle therebetween to achieve various angular relationships in various sitting and sleeping positions of the passenger seat.

17 Claims, 8 Drawing Sheets

SEATBACK ARTICULATION ASSEMBLY AND METHOD

BACKGROUND

Passenger seats in premium classes aboard commercial aircraft and other conveyances can be adjustable to achieve various sitting positions. In aircraft, passenger seats typically adjust between an upright sitting position for taxi, take-off and landing (TTOL), and a less upright, more comfortable sitting position during flight. In super premium classes on long haul flights, where passenger space is at a maximum, passenger seats can adjust to a flat horizontal bed.

Passenger seats typically include at a minimum a seatback and a seat bottom or seat pan. In the TTOL position, the seat pan may be at a shallow angle to horizontal and the seatback near vertical, thus positioning the sitting passenger in the optimum position to support the upper body, neck, and head in the event of a sudden deceleration event. In the full sleeping position, the seatback and seat bottom may be coplanar and horizontal. Passenger seats can optionally include legrests and armrests, which together with the seatback and seat pan adjust in the various sitting positions to maximize support and comfort.

Conventional seatbacks are unsegmented and either linear or fixed in curvature. As such, seat adjustability is limited to the achievable angles between the seatback and the seat pan. Considering that upper body curvature may vary between passengers, and that single angle seat adjustability cannot achieve all desirable intermediate sitting positions, what is needed is a multi-angle adjustable seat. Such a desirable seat would allow full customization in achievable seat angles, a variety of intermediate sitting positions, and in a mechanical assembly without the need for multiple actuators.

SUMMARY

In one aspect, embodiments of the inventive concepts disclosed herein are directed to a seatback articulation assembly for a passenger seat including an adjustable seat pan, a lower seatback pivotally connected to the adjustable seat pan, an upper seatback pivotally connected to the lower seatback, and a link pivotally connected at one end to the adjustable seat pan, the link including a contoured free end disposed between a lower seatback cam follower and an upper seatback cam follower, the contoured free end including opposing first and second cam surfaces along which the respective lower and upper seatback cam followers travel as the link moves to control an angular relationship between the lower seatback and the upper seatback.

In a further aspect, the opposing first and second cam surfaces may be asymmetrical about a longitudinal axis of the contoured free end, and wherein the first cam surface may face in a first direction and the second cam surface may face in a second direction opposite the first direction.

In a further aspect, the lower seatback cam follower may be a vertically oriented roller disposed on the lower seatback near a pivotal connection point of the lower seatback and the upper seatback.

In a further aspect, the upper seatback includes a bracket and the upper seatback cam follower may be a vertically oriented roller disposed on the bracket, and wherein the bracket may include a first range limiter adapted to engage the lower seatback to limit angular travel of the upper seatback relative to the lower seatback in a first direction, and a second range limiter adapted to engage the lower seatback to limit angular travel of the upper seatback relative to the lower seatback in a second direction opposite the first direction.

In a further aspect, the link may include a linear portion disposed between the contoured free end and a pivotal attachment point of the link and the adjustable seat pan.

In a further aspect, the contoured free end may include a bulge adapted to drive the lower and upper seatback cam followers apart to increase an angle between the lower seatback and the upper seatback, and wherein the lower and upper seatback cam followers may come together as the lower and upper seatback cam followers move away from the bulge to lessen the angle between the lower seatback and the upper seatback.

In a further aspect, the seatback may be configured to move between an upright sitting position and a flat bed position through at least one intermediate sitting position, and wherein a maximum angle between the lower seatback and the upper seatback is realized in the at least one intermediate sitting position and no angle between the lower seatback and the upper seatback is realized in the flat bed position.

In a further aspect, the adjustable seat pan may be pivotally connected to a drive rail configured to horizontally translate relative to a static seat frame member, and wherein horizontal translation of the drive rail may induce an angular change in the adjustable seat pan thereby causing movement of the link relative to the lower and upper seatback cam followers.

In a further aspect, a pivotal connection point of the adjustable seat pan and the lower seatback may be disposed near a top of a backend of the adjustable seat pan, and a pivotal connection point of the adjustable seat pan and the link may be disposed near a bottom of the backend of the adjustable seat pan such that the pivotal connection point of the adjustable seat pan and the lower seatback is spaced apart from the pivotal connection point of the adjustable seat pan and the link.

In a further aspect, the upper seatback may include a headrest.

In another aspect, embodiments of the inventive concepts disclosed herein are directed to a passenger seat including a seat pan adjustable in at least one of horizontal position and angle, a lower seatback pivotally connected at one end to the seat pan, an upper seatback pivotally connected at one end to the lower seatback, and a contoured link pivotally connected at one end to the seat pan, the link including a contoured free end disposed between a lower seatback cam follower and an upper seatback cam follower, the contoured free end including first and second cam surfaces along which the respective lower and upper seatback cam followers travel in response to link movement therebetween.

In a further aspect, the first and second cam surfaces may be asymmetrical about a longitudinal axis of the contoured free end, and wherein the first cam surface faces forward relative to the passenger seat and the second cam surface faces rearward relative to the passenger seat.

In a further aspect, the lower seatback cam follower may be a vertically oriented roller disposed on the lower seatback, and the upper seatback cam follower may be a vertically oriented roller disposed on the upper seatback.

In a further aspect, the upper seatback may include a bracket having a first range limiter adapted to engage the lower seatback to limit angular travel of the upper seatback relative to the lower seatback in a first direction, and a second range limiter adapted to engage the lower seatback to limit angular travel of the upper seatback relative to the lower seatback in a second direction opposite the first direction.

In a further aspect, the contoured free end may be shaped to include a bulge adapted to drive the lower and upper seatback cam followers apart to increase an angle between the lower seatback and the upper seatback, and wherein the lower and upper seatback cam followers come together as the lower and upper seatback cam followers move away from the bulge to lessen the angle between the lower seatback and the upper seatback.

In a further aspect, the seat pan may be pivotally connected to a drive rail configured to horizontally translate relative to a static seat frame member, and wherein horizontal translation of the drive rail induces an angular change in the seat pan thereby driving movement of the link relative to the lower and upper seatback cam followers.

In another aspect, embodiments of the inventive concepts disclosed herein are directed to a method of controlling an angle between segments of a segmented seatback, the method including providing a segmented seatback including a lower seatback pivotally connected at one end to an adjustable seat pan and at an opposing end to an upper seatback, providing a link pivotally connected at one end to the adjustable seat pan, the link including a contoured free end disposed between a lower seatback cam follower disposed on the lower seatback and an upper seatback cam follower disposed on the upper seatback, the contoured free end including opposing first and second cam surfaces along which the respective lower and upper seatback cam followers travel in response to link movement therebetween, and changing an angle of the adjustable seat pan to induce movement of the link relative to the lower and upper cam followers thereby changing an angle between the lower seatback and the upper seatback.

In a further aspect, the opposing first and second cam surfaces may be asymmetrical about a longitudinal axis of the contoured free end, and wherein the contoured free end includes a bulge adapted to drive the lower and upper seatback cam followers apart to increase an angle between the lower seatback and the upper seatback, and wherein the lower and upper seatback cam followers come together as the lower and upper seatback cam followers move away from the bulge to lessen the angle between the lower seatback and the upper seatback.

In a further aspect, the segmented seatback is configured to move between an upright sitting position and a flat bed position through at least one intermediate sitting position, and wherein a maximum angle between the lower seatback and the upper seatback may be realized in the at least one intermediate sitting position and no angle between the lower seatback and the upper seatback may be realized in the flat bed position.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

The inventive concepts disclosed herein are generally directed to a passenger seat configured to achieve various upright, intermediate, and sleeping sitting positions. The seatback can be segmented into at least two portions, for example, a lower seatback portion and an upper seatback portion such that the angle therebetween can be controlled for maximum adjustability in the seatback itself. The seatback can be further segmented into more than two portions by repeating the articulation assembly between each of the respective attached seatback portions. Articulation in the seatback can be driven by movement of the interconnected seat pan, for example, angular movement in the seat pan can serve to drive articulation in the seatback, thereby achievable a plurality of angles in and between the seat pan and seatback portions to achieve various sitting positions not achievable in a conventional passenger seat assembly.

Figure 1:
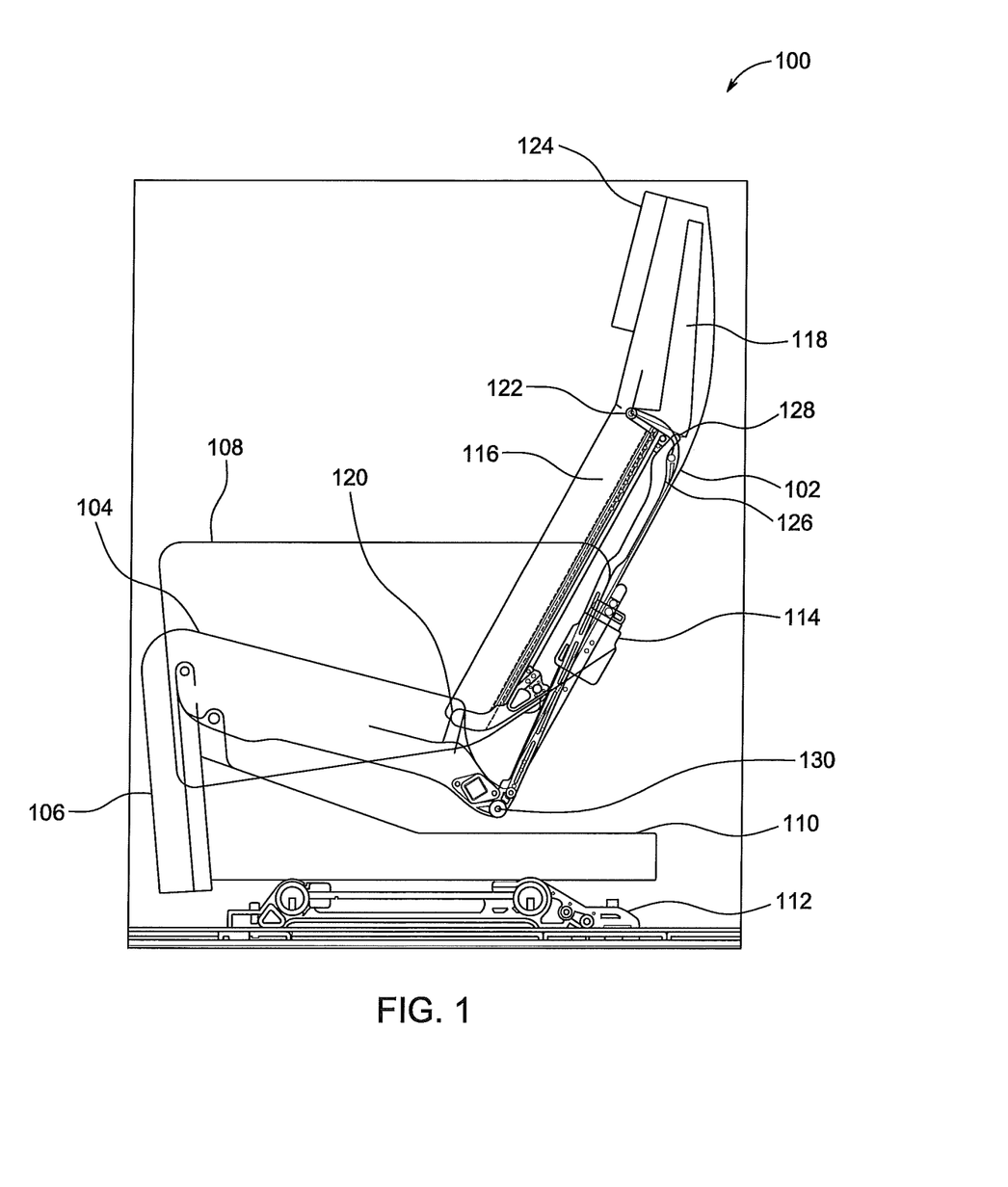
FIG. 1 is side elevation view of a passenger seat having a seatback segmented into lower and upper seatback portions.

In an exemplary embodiment, FIG. 1 illustrates a passenger seat 100 suitable for use aboard an aircraft or other conveyance. The passenger seat 100 generally includes a segmented seat back 102, also referred to herein as the "seatback", and a seat pan 104, also referred to herein as the "seat bottom." The passenger seat 100 can optionally include a legrest 106 and one or more armrests 108. The passenger seat 100 is mounted upon a pair of spaced guide rails 110, which represent an exemplary, non-limiting configuration for driving seat pan motion. The guide rails 110 are configured to horizontally translate relative to a static frame member 112 adapted to mount to the floor. The static frame member 112 can include legs and spaced beam tubes, and track fasteners can serve to mount the static frame member 112 to the floor.

The passenger seat 100 can include a linear or other type actuator positioned below the seat pan 104 arranged to drive horizontal translation of the guide rails 110. The guide rails 110 can be spaced apart and symmetrically arranged to stably support the passenger seat 100. As shown, a linear or other type actuator 114 can be positioned behind the seatback 102 to drive articulation motion, although as discussed in detail below, seatback articulation can be driven by seat pan motion.

The seatback 102 is segmented or divided into a lower seatback 116 and an upper seatback 118. The lower seatback 116 is pivotally attached at one end to the backend of the seat pan 104 at a pivotal connection point 120. The upper seatback 118 is pivotally attached at one end to the lower seatback 116 at a pivotal connection point 122. In this configuration, the lower seatback 116 is configured to pivot relative to the seat pan 104, and the upper seatback 118 is configured to pivot relative to the lower seatback 116. The lower seatback 116 can extend from near the top of the seat pan 104 to near the middle-to-upper back of the sitting passenger. The upper seatback 118 can extend from about the middle-to-upper back of the sitting passenger to the top of head or above. The upper seatback 118 can carry a headrest 124, which can be fixed in position or adjust relative to the upper seatback 118 in at least one of space therefrom, angle, vertical height, etc.

A contoured link 126, also referred to herein as the "link," is pivotally attached at one end to the seat pan 104. A free end 128 of the link 126 extends generally coextensive with the lower seatback 116. As used herein, the term "free end" denotes the lack of attachment, pivotal or otherwise, to another seat component. By being detached, the free end 128 of the link 126 is able to move (e.g. translate) relative to cam followers on the lower and upper seatback portions. The contoured link 126 is pivotally attached to the seat pan 104 at a pivotal connection point 130. The pivotal connection point 120 of the seat pan 104 and the lower seatback 116 can be disposed near the top of the backend of the seat pan 104, while the pivotal connection point 130 of the seat pan 104 and the link 126 can be disposed near the bottom of the backend of the seat pan 104. In this arrangement, the two pivotal connection points 120, 130 are spaced apart. As shown, the link 124 is attached to a rearward extension of the seat pan 104 to space the connection points 120, 130 apart, wherein the extension length/spacing is determinative of the amount of travel of the link based on the amount of angular travel capable in the seat pan 104.

Figure 2:
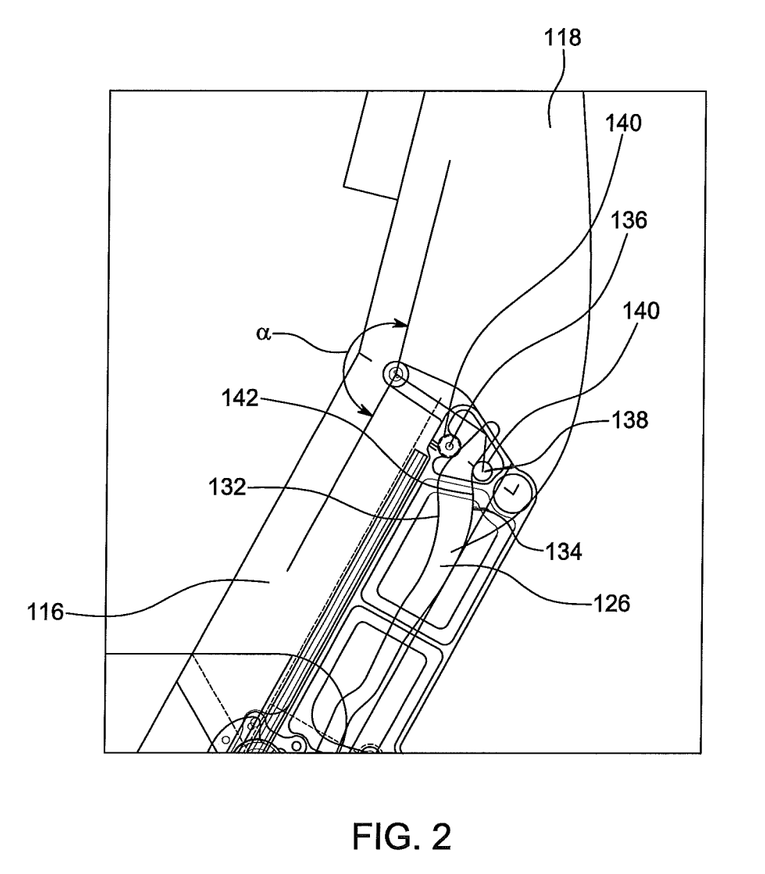
FIG. 2 is a detailed view of the pivotal connection point of the lower and upper seatback portions.

Referring to FIG. 2, the angle α between the lower seatback 116 and the upper seatback 118 is determined based on the position of the link 126, with the position of the link 126 determined based on the angle and/or horizontal position of the seat pan. As shown, the angle α is shallow, which can be achieved for intermediate lounge and sleeping sitting positions, among other sitting positions. The link 126 is contoured, meaning that opposing faces of the link are shaped other than non-linear. The opposing faces include a forward-facing cam surface 132 and a rearward-facing cam surface 134. As shown, the opposing first and second cam surfaces 132, 134 are asymmetrical about a longitudinal axis of the contoured free end 128, wherein the first cam surface 132 faces in a first direction and the second cam surface 134 faces in a second direction opposite the first direction. The opposing sides of the link 126 may not be bearing surfaces, and as such can be flat.

A lower seatback cam follower 136 is disposed on the lower seatback 116 and bears against/travels along the forward-facing cam surface 132. The upper seatback cam follower 138 is disposed on the upper seatback 118 and bears against/travels along the rear-facing cam surface 134. Thus, the free end 128 of the contoured link 126 is disposed between the lower and upper seatback cam followers 136, 138. Each of the cam followers 136, 138 can include a vertically-oriented roller 140 for facilitating rolling travel along the cam surfaces of the moving link 126. Like the guide rails 110, the link and cam follower arrangement can be symmetrically duplicated on the segmented seatback 102 to stably support the seatback and facilitate smooth movement thereof.

The link 126 can be contoured to have any predetermined shape to achieve an angular relationship between the lower and upper seatback portions 116, 118 in the various sitting positions. As shown, the link 128 is linear in shape near the pivotal connection point 130, where no cam surface is required, and transitions into the contoured free end 128. The contoured free end 128 includes a mid-span bulge 142 adapted to drive the lower and upper seatback cam followers 136, 138 apart when over the bulge to increase/steepen the angle α between the lower seatback 116 and the upper seatback 118. The lower and upper seatback cam followers 136, 138 come together when both lie on the same side of the bulge 142, thereby lessening the angle α between the lower seatback and the upper seatback 116, 118.

Figure 3:
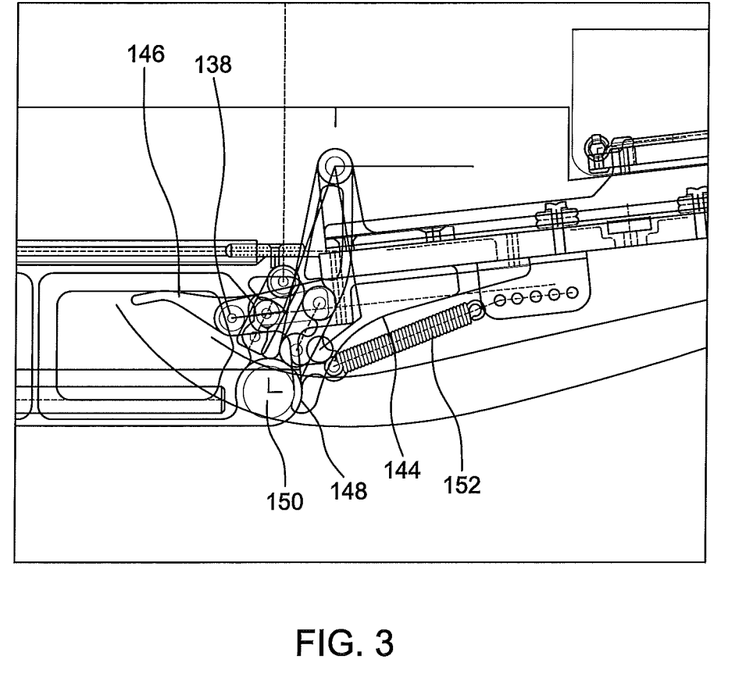
FIG. 3 is a detailed view of the pivotal connection point of the lower and upper seatbacks portion showing the seat in a flat bed sleeping position.

Referring to FIG. 3, the upper seatback 118 can include a range-limiting bracket 144. The upper seatback cam follower 138 can be disposed on the bracket 144 in the form of a vertically-oriented roller. The bracket can include at least one a first range limiter 146 adapted to engage the lower seatback 116 to limit angular travel of the upper seatback 118 relative to the lower seatback 116 in a first direction, and a second range limiter 148 adapted to engage the lower seatback 116 to limit angular travel of the upper seatback 118 relative to the lower seatback 116 in a second direction opposite the first direction.

The first range limiter 146, for example, can limit the maximum angle achievable between the upper seatback 118 and the lower seatback 116, typically employed in an intermediate or lounge sitting position. The second range limiter 148, for example, can limit the minimum achievable angle between the upper seatback 118 and the lower seatback 116, typically employed in the full flat bed or lie flat sitting position. FIG. 3 shows the second range limiter 148 directly contacting a beam tube 150 of the lower seatback 116 to prevent over-rotation of the upper seatback 118 "downward" beyond horizontal. The first and second range limiters 146, 148 of the bracket 144 therefore define the total possible angular travel/range of the upper seatback 118 relative to the lower seatback 116.

By engaging a rigid support structure, such as a beam tube 150, the range limiters further stably support the upper seatback 118 relative to the lower seatback 116 at the ends of angular travel, as typically employed in the intermediate and flat bed sitting positions. The upper seatback 118 can further be biased in one direction to help return the upper seatback 118 to a preferred position. As shown, a helper spring 152 can be arranged to bias the upper seatback 118 toward a shallow angle relative to the lower seatback 116.

Figure 4:
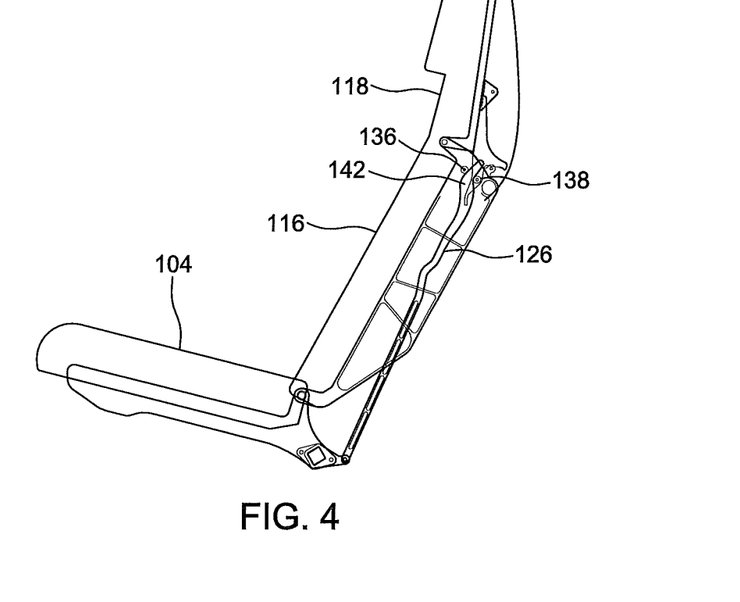
FIG. 4 is a side view showing the seat in an upright sitting position for taxi, take-off, and landing (TTOL)

FIGS. 4-9 shows various sitting positions achievable utilizing the seatback articulation apparatus. FIG. 4 shows an exemplary TTOL sitting position in which the seat pan 104 is at a relatively steep angle to horizontal, the lower seatback 116 is near vertical, and the upper seatback 118 is at a shallow angle to the lower seatback 116. A TTOL seat pan angle can be, for example, at or near 15 degrees from horizontal. In the TTOL sitting position, the seat pan 104 can be at the rearwardmost horizontal position thereof such that the link 126 is near vertical and "withdrawn" relative to the lower and upper seatback cam followers 136, 138 such that the two cam followers are positioned above the bulge 142, and thus relatively close together.

Figure 5:
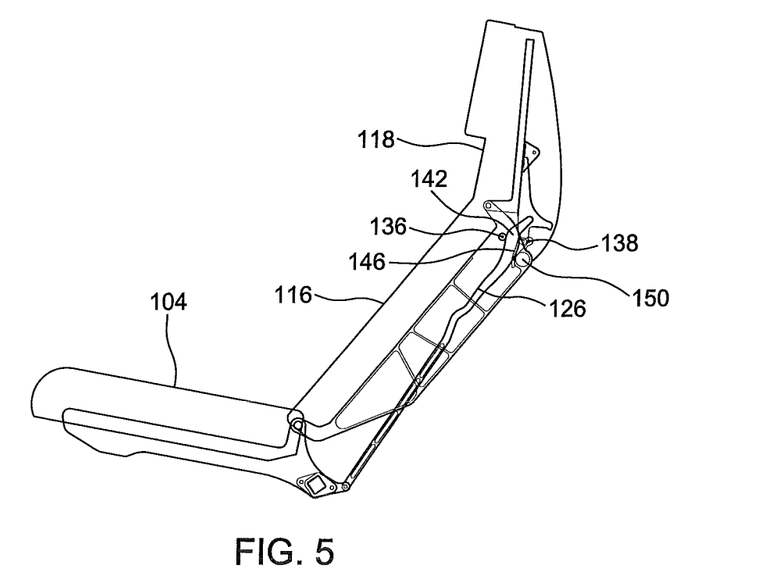
FIG. 5 is a side view showing the seat in an intermediate sitting position.

FIG. 5 shows an exemplary intermediate or lounge sitting position in which the seat pan 104 is near the TTOL seat pan angle, the lower seatback 116 is reclined, and the upper seatback 118 is at a steep angle to the lower seatback 116. In this intermediate sitting position, the seat pan 104 can be driven forward such that the link 126 moves away from vertical and moved upward relative to the lower and upper seatback cam followers 136, 138 such that the two cam followers are position on opposite sides of the bulge 142, and thus relatively far apart. In this position, the first range limiter 146 is directly contacting the beam tube to prevent forward over travel.

Figure 6:
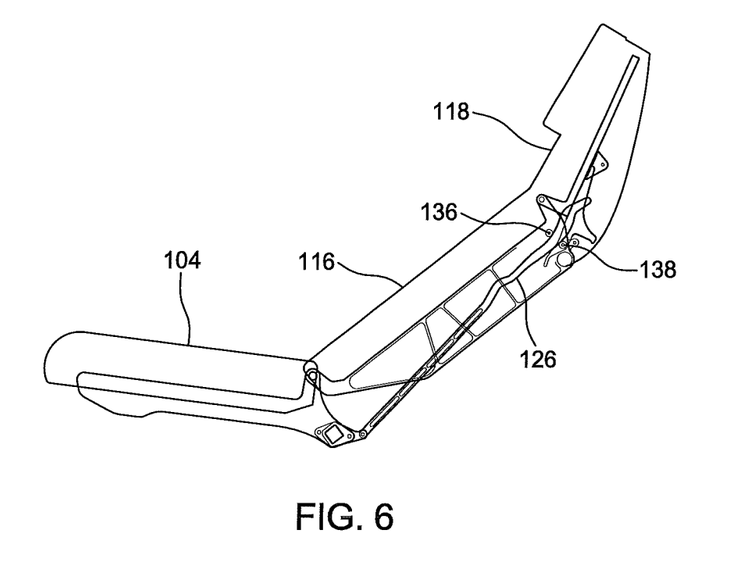
FIG. 6 is a side view showing the seat in another intermediate sitting position.

FIG. 6 shows another exemplary intermediate or lounge sitting position in which the seat pan 104 is near horizontal, the lower seatback 116 is steeply reclined, and the upper seatback 118 is at a shallow angle to the lower seatback 116. In this intermediate sitting position, the seat pan 104 can be driven further forward as compared to that shown in FIG. 5, such that the link 126 moves away from vertical and further into the lower and upper seatback cam followers 136, 138 such that the two cam followers are positioned on the near side of the bulge 142, and thus move closer together to decrease the angle of the upper seatback 118.

Figure 7:
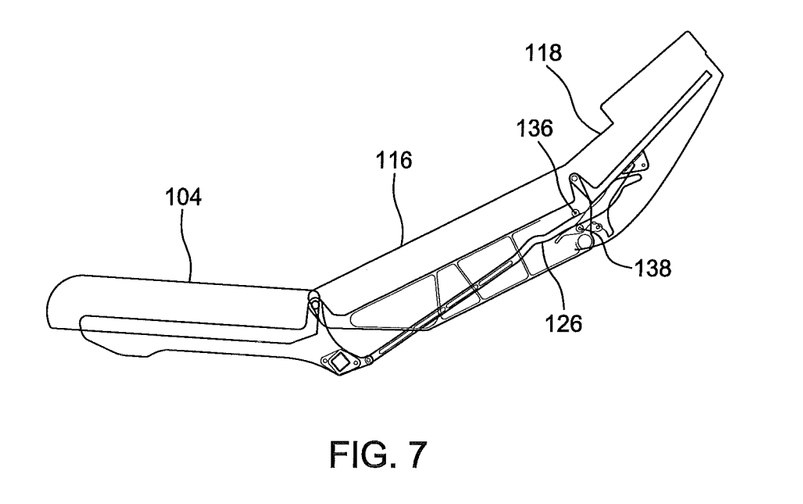
FIG. 7 is a side view showing the seat in yet another intermediate sitting position.

FIG. 7 shows yet another exemplary intermediate or lounge sitting position in which the seat pan 104 is near horizontal, the lower seatback 116 is steeply reclined, and the upper seatback 118 is nearly coplanar with the lower seatback 116. In this intermediate sitting position, the seat pan 104 can be driven further forward as compared to that shown in FIG. 6, such that the link 126 moves closer to horizontal and further into the lower and upper seatback cam followers 136, 138.

Figure 8:
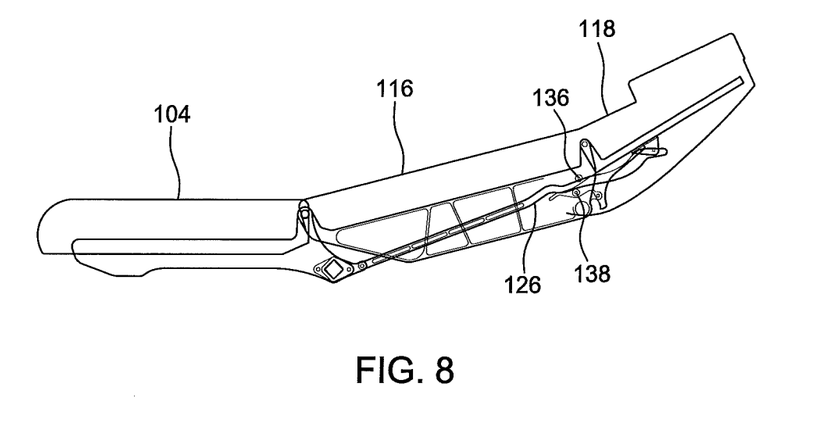
FIG. 8 is a side view showing the seat in yet another intermediate sitting position.

FIG. 8 shows another exemplary intermediate or near sleeping sitting position in which the seat pan 104 is near or at horizontal, the lower seatback 116 is near horizontal, and the upper seatback 118 is at a shallow angle to the lower seatback 116. In this intermediate sitting position, the seat pan 104 can be driven further forward as compared to that shown in FIG. 7, such that the link 126 moves toward horizontal and further into the lower and upper seatback cam followers 136, 138.

Figure 9:
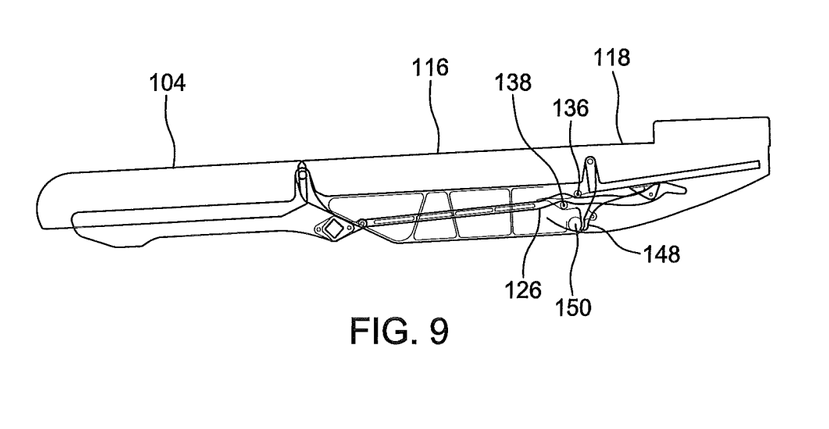
FIG. 9 is a side view showing the seat in a flat bed position.

FIG. 9 shows an exemplary flat bed sleeping position in which the seat pan 104, lower seatback 116, and upper seatback 118 are coplanar, at or near horizontal. In this flat bed or lie flat position, the seat pan 104 is driven fully forward such that the link 126 is driven farthest into the cam followers 136, 138. In the flat bed position, the second range limiter 148 rests against the beam tube 150 to prevent over travel of and stably support the upper seatback 118, as well as reduce the load on the upper seatback cam follower 138.

Figure 10:
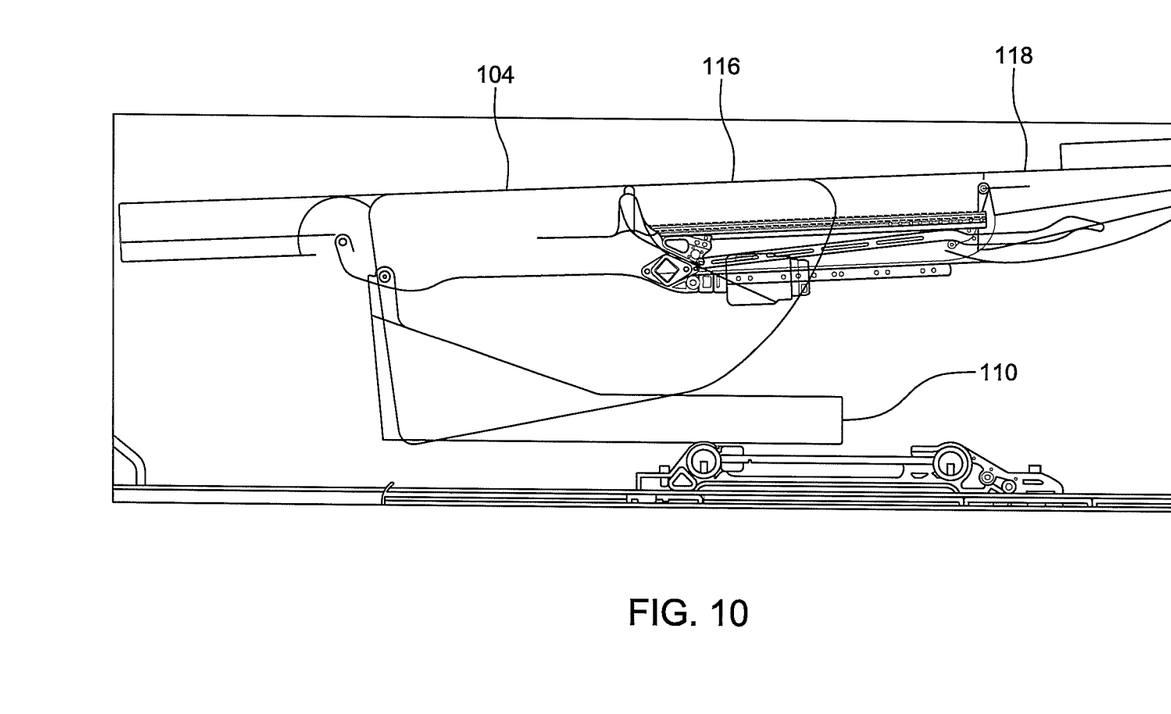
FIG. 10 is a side view showing the seat of FIG. 1 in a flat bed position.

FIG. 10 shows the guide rails 110 in the fully forward translation position and the seat in the full flat bed sitting position. Although not shown, the angle of the seat pan can be guided, for example, utilizing guide slots or cam surfaces and cam followers to control seat pan angle throughout the range of motion. The shape of the contoured free end 128 can be customized to control seat pan angle of the upper seatback 118 relative to the lower seatback 116 throughout the range of motion of the seat.

Figure 11:
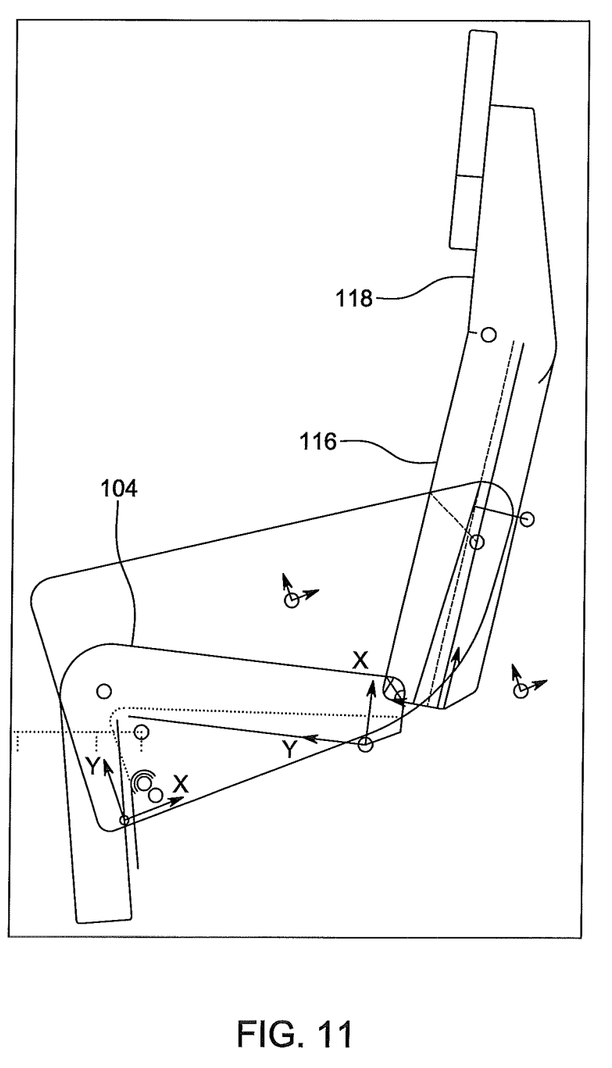
FIG. 11 is a side view showing the seat in work/dine sitting position.

FIG. 11 illustrates an achievable work/dine sitting position in which the seat pan 104 is near horizontal, the lower seatback 116 is near vertical, and the upper seatback 118 is at a shallow angle to the lower seatback 116. In this work/dine sitting position; the seat pan 104 can be driven rearward as compared to the TTOL position such that the link moves relative to the lower and upper seatback cam followers. The seat pan angle in the work/dine sitting position can be, for example, at or near 8 degrees from horizontal.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A seatback articulation assembly for a passenger seat, comprising:
   an adjustable seat pan;
   a lower seatback pivotally connected to the adjustable seat pan;
   an upper seatback pivotally connected to the lower seatback; and
   a link pivotally connected at one end to the adjustable seat pan, the link comprising a contoured free end disposed between a lower seatback cam follower and an upper seatback cam follower, the contoured free end comprising opposing first and second cam surfaces along which the respective lower and upper seatback cam followers travel as the link moves to control an angular relationship between the lower seatback and the upper seatback, the opposing first and second cam surfaces asymmetrical about a longitudinal axis of the contoured free end, and the first cam surface facing in a first direction and the second cam surface facing in a second direction opposite the first direction.

2. The seatback articulation assembly of claim 1, wherein the lower seatback cam follower is a vertically oriented roller disposed on the lower seatback near a pivotal connection point of the lower seatback and the upper seatback.

3. The seatback articulation assembly of claim 1, wherein the upper seatback comprises a bracket, wherein the upper seatback cam follower is a vertically oriented roller disposed on the bracket, and wherein the bracket comprises a first range limiter adapted to engage the lower seatback to limit angular travel of the upper seatback relative to the lower seatback in a first direction, and a second range limiter adapted to engage the lower seatback to limit angular travel of the upper seatback relative to the lower seatback in a second direction opposite the first direction.

4. The seatback articulation assembly of claim 1, wherein the link comprises a linear portion disposed between the contoured free end and a pivotal attachment point of the link and the adjustable seat pan.

5. The seatback articulation assembly of claim 1, wherein the contoured free end comprises a bulge adapted to drive the lower and upper seatback cam followers apart to increase an angle between the lower seatback and the upper seatback, and wherein the lower and upper seatback cam followers come together as the lower and upper seatback cam followers move away from the bulge to lessen the angle between the lower seatback and the upper seatback.

6. The seatback articulation assembly of claim 1, wherein the seatback is configured to move between an upright sitting position and a flat bed position through at least one intermediate sitting position, and wherein a maximum angle between the lower seatback and the upper seatback is realized in the at least one intermediate sitting position and no angle between the lower seatback and the upper seatback is realized in the flat bed position.

7. The seatback articulation assembly of claim 1, wherein the adjustable seat pan is pivotally connected to a drive rail configured to horizontally translate relative to a static seat frame member, and wherein horizontal translation of the drive rail induces an angular change in the adjustable seat pan thereby causing movement of the link relative to the lower and upper seatback cam followers.

8. The seatback articulation assembly of claim 1, wherein a pivotal connection point of the adjustable seat pan and the lower seatback is disposed near a top of a backend of the adjustable seat pan, and a pivotal connection point of the adjustable seat pan and the link is disposed near a bottom of the backend of the adjustable seat pan such that the pivotal connection point of the adjustable seat pan and the lower seatback is spaced apart from the pivotal connection point of the adjustable seat pan and the link.

9. The seatback articulation assembly of claim 1, wherein the upper seatback comprises a headrest.

10. A passenger seat, comprising:
   a seat pan adjustable in at least one of horizontal position and angle;
   a lower seatback pivotally connected at one end to the seat pan;
   an upper seatback pivotally connected at one end to the lower seatback; and
   a contoured link pivotally connected at one end to the seat pan, the link comprising a contoured free end disposed between a lower seatback cam follower and an upper seatback cam follower, the contoured free end comprising first and second cam surfaces along which the respective lower and upper seatback cam followers travel in response to link movement therebetween; and
   a drive rail pivotally connected to the seal pan, the drive rail configured to translate horizontally relative to a static seal frame member, wherein horizontal translation of the drive rail induces an angular change in the seal pan thereby driving movement of the contoured link relative to the lower and upper seatback cam followers.

11. The passenger seat of claim 10, wherein the first and second cam surfaces are asymmetrical about a longitudinal axis of the contoured free end, and wherein the first cam surface faces forward relative to the passenger seat and the second cam surface faces rearward relative to the passenger seat.

12. The passenger seat of claim 10, wherein the lower seatback cam follower is a vertically oriented roller disposed on the lower seatback, and the upper seatback cam follower is a vertically oriented roller disposed on the upper seatback.

13. The passenger seat of claim 10, wherein the upper seatback comprises a bracket comprising a first range limiter adapted to engage the lower seatback to limit angular travel of the upper seatback relative to the lower seatback in a first direction, and a second range limiter adapted to engage the lower seatback to limit angular travel of the upper seatback relative to the lower seatback in a second direction opposite the first direction.

14. The passenger seat of claim 10, wherein the contoured free end comprises a bulge adapted to drive the lower and upper seatback cam followers apart to increase an angle between the lower seatback and the upper seatback, and wherein the lower and upper seatback cam followers come together as the lower and upper seatback cam followers move away from the bulge to lessen the angle between the lower seatback and the upper seatback.

15. A method of controlling an angle between segments of a segmented seatback, the method comprising:
   providing a segmented seatback comprising a lower seatback pivotally connected at one end to an adjustable seat pan and at an opposing end to an upper seatback;
   providing a link pivotally connected at one end to the adjustable seat pan, the link comprising a contoured free end disposed between a lower seatback cam follower disposed on the lower seatback and an upper seatback cam follower disposed on the upper seatback, the contoured free end comprising opposing first and second cam surfaces along which the respective lower and upper seatback cam followers travel in response to link movement therebetween; and
   changing an angle of the adjustable seat pan to induce movement of the link relative to the lower and upper cam followers thereby changing an angle between the lower seatback and the upper seatback;
   wherein the segmented seatback is configured to move between an upright sitting position and a flat bed position through at least one intermediate sitting position, wherein a maximum angle between the lower seatback and the upper seatback is realized in the at least one intermediate sitting position and no angle between the lower seatback and the upper seatback is realized in the flat bed position.

16. The method of claim 15, wherein the opposing first and second cam surfaces are asymmetrical about a longitudinal axis of the contoured free end, and wherein the contoured free end comprises a bulge adapted to drive the lower and upper seatback cam followers apart to increase an angle between the lower seatback and the upper seatback, and wherein the lower and upper seatback cam followers come together as the lower and upper seatback cam followers move away from the bulge to lessen the angle between the lower seatback and the upper seatback.

17. The method of claim 15, wherein the lower seatback cam follower is a vertically oriented roller disposed on the lower seatback and the upper seatback cam follower is a vertically oriented roller disposed on the upper seatback.

* * * * *